United States Patent
Perreault et al.

[15] 3,658,392
[45] Apr. 25, 1972

[54] TRACKED VEHICLE SUSPENSION

[72] Inventors: Jules Perreault, Sherbrooke, Quebec; Bertrand Southiere, Granby, Quebec, both of Canada

[73] Assignee: Bombardier Limited, Valcourt, Quebec, Canada

[22] Filed: Sept. 28, 1970

[21] Appl. No.: 76,207

Related U.S. Application Data

[63] Continuation of Ser. No. 794,628, Jan. 28, 1969, abandoned.

[30] Foreign Application Priority Data

Jan. 10, 1969    Canada...................................39,810

[52] U.S. Cl..................................305/24, 180/5 R, 305/27
[51] Int. Cl........................................................B62d 55/10
[58] Field of Search.....................180/5 R; 305/24, 27, 35 EB

[56] References Cited

UNITED STATES PATENTS

| | | | |
|---|---|---|---|
| 1,297,104 | 3/1919 | Colahan | 305/27 |
| 1,885,486 | 11/1932 | Smyth | 305/27 X |
| 2,284,075 | 5/1942 | Tucker | 180/5 |
| 3,485,312 | 12/1969 | Swenson | 180/5 |
| 3,545,821 | 12/1970 | Erickson | 180/5 R |
| 2,339,886 | 1/1944 | Shannon | 180/5 |

FOREIGN PATENTS OR APPLICATIONS 151,835    3/1932    Switzerland...........................305/27

*Primary Examiner*—Richard J. Johnson
*Attorney*—Smart & Biggar and Larson, Taylor and Hinds

[57] ABSTRACT

A suspension system for tracked vehicles especially small snowmobiles, which has longitudinally aligned skid elements that are articulated to one another and are resiliently held against the inside surface of the ground engaging portion of the track.

4 Claims, 7 Drawing Figures

PATENTED APR 25 1972

INVENTORS
JULES PERREAULT
BERTRAND SOUTHIERE
BY Smart & Biggar
ATTORNEYS.

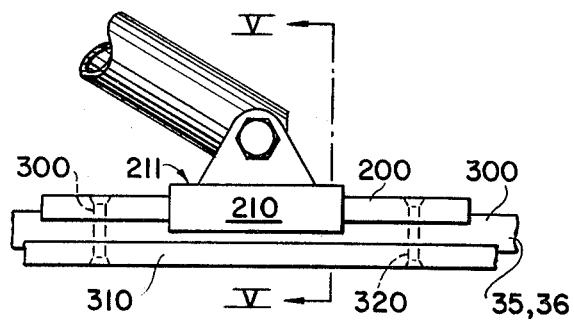
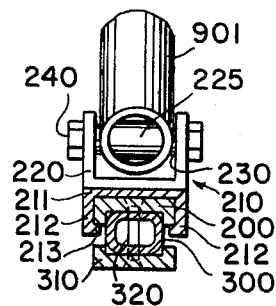
FIG. 4   FIG. 5
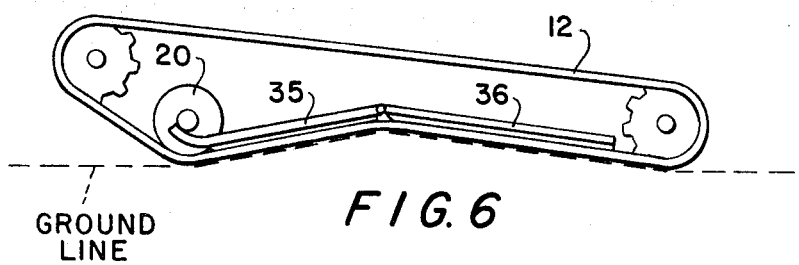
FIG. 6
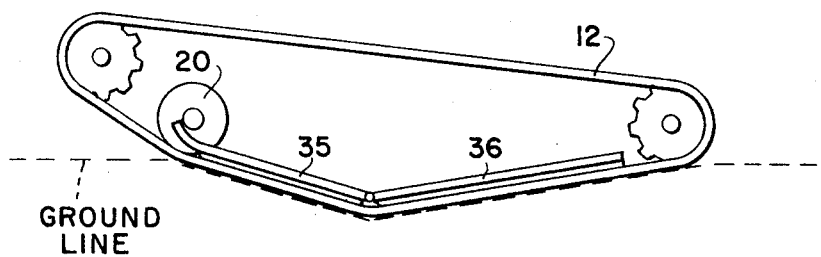
FIG. 7

TRACKED VEHICLE SUSPENSION

This is a continuation of Ser. No. 794,628, filed Jan. 28, 1969, now abandoned.

SUMMARY OF THE INVENTION

As is well known in the art, means must be provided for applying the weight of a tracked snow vehicle, e.g. large, passenger snowmobiles and small snowmobiles upon the ground engaging portion of the track in as uniform a manner as possible. To this effect wheel bogies can be used which carry one or more relatively small wheels or alternatively skids, that contact the upper surface of the ground engaging portion of the track.

In the case of small snowmobiles (hereinafter referred to as "snowmobiles") bogy wheels are used nearly exclusively. This system when properly designed affords good traction and does not necessitate use of objectionably heavy suspension components. Unfortunately for a sufficiently uniform ground pressure a fairly large number of bogy wheels are required since the track is essentially made of flexible material. e.g. rubber, with or without rigid reinforcements. For example, it is not uncommon to use as many as 12 to 16 bogy wheels, each individually mounted on a stub axle by means of a roller or ball bearing. Hence this arrangement remains complicated and costly to produce and requires regular maintenance and repairs. Furthermore it has been discovered that at high speeds the force required to maintain the bogy wheels in rotation becomes significant.

It has therefore been proposed to replace the bogy wheels by skate-like skid members, and a snowmobile using a skid suspension has been used commercially. This prior arrangement incorporates two side by side rigid skids extending along the entire length of the ground engaging portion of the track and interconnected to one another so as to form a rigid chassis which is resiliently supported to the frame of the snowmobile. With this structure, which is relatively heavy, the ground engaging portion of the track presents itself as a flat surface which cannot be bent in the longitudinal direction; as a result the arrangement cannot follow the contour of uneven grounds as can the above noted bogy wheel suspension system, and the traction of the track with a snow surface suffers. Nevertheless this rigid skid suspension does away with a multiplicity of parts such as wheels and bearing and offers a smoother ride than wheel bogy suspensions.

The object of this invention therefore is to provide a skid suspension for tracked vehicles, especially snowmobiles, which combines the advantages of the above noted prior skid suspension with the superior traction and lightness of the widely used bogy wheel suspension systems.

We have found that this can be achieved by providing skid means combined with suitable lever means and spring means, wherein the skid means includes at least two skid members which are articulated to one another.

With this suspension system the ground contacting track portion can yield longitudinally to accommodate for ground irregularities, and better traction than with the noted prior rigid skid arrangement, can be obtained. We have also discovered that with this articulated arrangement the suspension design can be substantially simplified and when compared with said rigid skid design a 2:1 weight gain is possible.

BRIEF DESCRIPTION OF DRAWINGS

FIG. 4 is an enlarged representation of a part of a skid,

FIG. 5 is a cross-sectional view taken along line V—V of FIG. 4; and

FIGS. 6 and 7 are schematic representations of the suspension system of FIG. 1, over different ground irregularities.

With reference to the accompanying drawings FIG. 1 illustrates a suspension system for supporting a snowmobile frame 10 upon the lower, ground-engaging portion of endless track 12. The suspension system as shown in FIGS. 1, 2 and 3 comprises a pair of leading wheels 20, 21 which bear against the inside surface of track 12, and which may be rotatably connected to the leading portion of skids 30, 31. Each skid 30, 31 in the illustrated embodiment incorporates two skid members 35, 36 which extend in longitudinal direction of track 12 and are articulated to one another as shown at 38. The leading end of the front skid member 35 is rigidly connected to the mounting means of leading wheels 20 and 21 and the trailing end of the rear skid member 36 is left more or less free to ride on the belt although, as will be seen hereinafter, subjected to the action of torsion springs.

Figure 1:
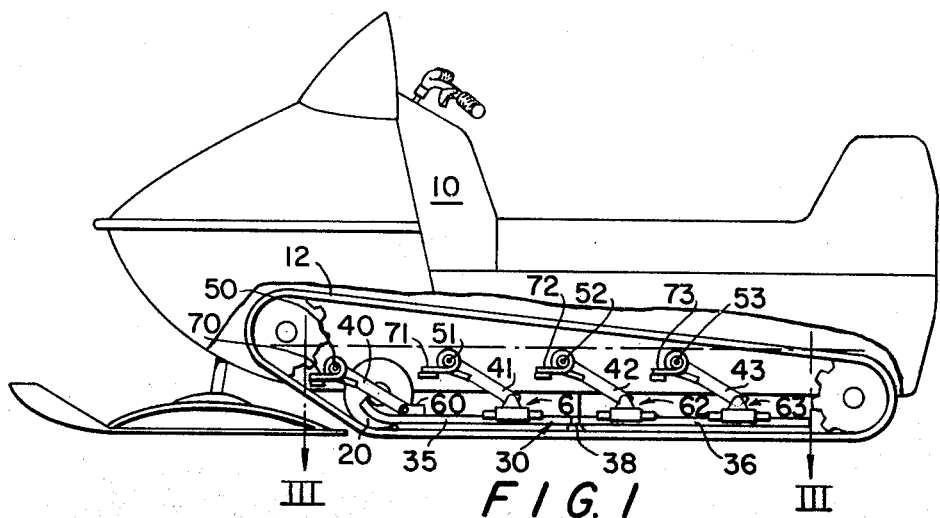
FIG. 1 is a side view of a suspension system as installed on a snowmobile.

In order to mount the skid members 35 and 36 onto the frame of the vehicle 10 a number of supporting arm assemblies (four being used in the illustrated embodiment 40, 41, 42 and 43) which are pivotally connected to frame 10 by means of cross-shafts 50, 51, 52 and 53 and project generally rearwardly and downwardly therefrom to meet skid members 35 and 36 as shown at 60, 61, 62 and 63. Each supporting arm assembly 40, 41, 42 or 43 is urged downwardly in a clockwise direction as seen in FIG. 1 by means of torsion springs 70, 71, 72 and 73, and as illustrated these torsion springs can be formed of coiled spring wires having their respective end portions retained to the frame 10 and to a part of the associated supporting arm assembly 40, 41, 42 or 43. Hence, with this arrangement the ground engaging portion of track 12 is resiliently maintained at a suitable distance from the underside of frame 10, and by properly selecting the gauge of torsion springs 70 to 73 and adjusting the length and the angle of the supporting arm assemblies 40 to 43, the body of vehicle 10 can be kept a safe, predetermined distance from the ground in the rest and travelling conditions.

It will therefore be appreciated that with the above described arrangement, the skids which define a generally flat configuration when vehicle 10 is riding over plane ground, can accommodate for substantial ground irregularities as is clearly illustrated in FIGS. 6 and 7. Furthermore, the occurrence of a depression or bump on the ground when the vehicle is moving will first deflect leading wheels 20 and 21 together with the leading end of the front skid member 35, thereafter will raise the inter-connected portions of skid members 35 and 36 and finally, raise a trailing end of rear skid member 36 in succession without significantly affecting the general direction of movement of vehicle 10. This particularly desirable feature which is due to the fact that each skid member is free to move relative to the frame of the vehicle and relative to the other skid member on the same side, enables the suspension system to actually absorb slight ground irregularities and "average" more substantial ones, thereby giving the impression to the operator that the vehicle 10 is "floating" over the ground especially at higher speeds.

Another important feature of this suspension system over the above mentioned prior skid suspension arrangement is that when proceeding in fairly deep snow, the leading ends of the front skid member 35 on each side of vehicle 10 tend to leave the ground slightly while the rear skid members 36 remain generally horizontally, with the results that the leading portion of the ground engaging part of the track 12 assumes a certain angle of attack that enables the vehicle 10 to float over the snow and consequently, facilitates manoeuvering and enables higher speed.

Figure 3:
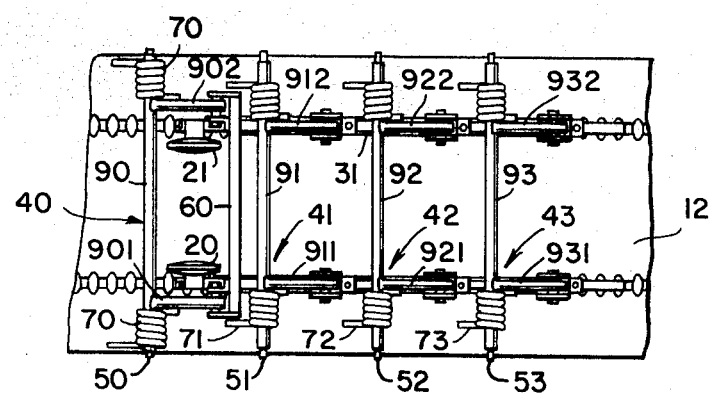
FIG. 3 is a cross-sectional view taken along line III—III of FIG. 1.
Figure 2:
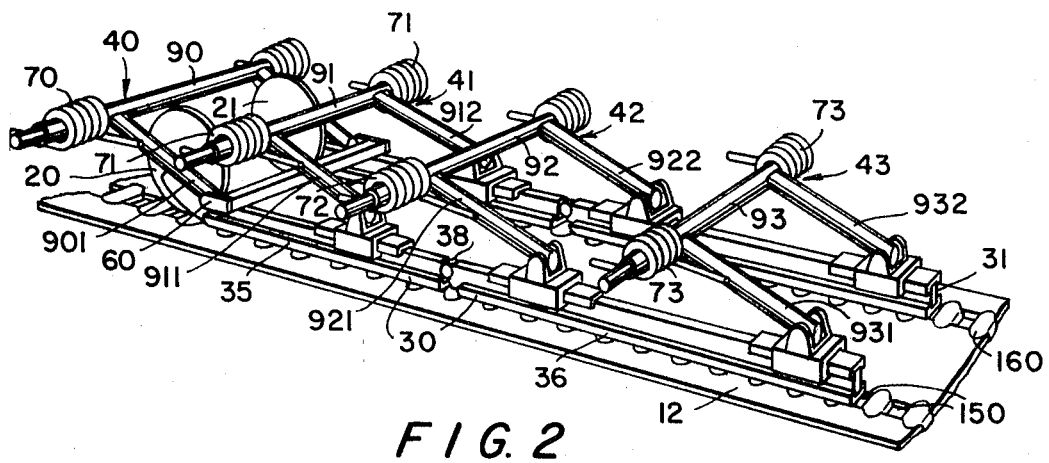
FIG. 2 is a perspective view of the suspension shown in FIG. 1.

Referring again to FIGS. 1, 2 and 3, each supporting arm assembly 40 to 43 comprises an upper cross tube 90, 91, 92 and 93 mounted around cross shaft 50 to 53 (see FIG. 3) and a pair of downwardly and rearwardly extending arms 901, 902, 911, 912, 921, 922 and 931, 932 which are rigidly connected to cross tube 90 to 93 thereby forming an inverted U-shaped arrangement pivoted around cross shaft 50 to 53. The torsion springs 70 to 73 can advantageously be mounted concentrically upon the end portions of the cross tubes 90 to 93 with one of their ends suitably coupled to the intermediate portion of the arms of the assemblies 40 to 43 by means of tabs.

The leading support arm assembly 40 is also pivotally connected to the leading wheels 20 and 21 and to the leading end of front skid member 35 as at the ends of cross bar 60, cross bar 60 being welded just behind the upwardly curved portion of skids 35. Due to the geometry of the arrangement and in order to enable the skid members 35 and 36 to yield to ground irregularities in the manner mentioned hereinabove, the different mounting arrangement must be provided at the connection of the lower end of the supporting arm assemblies 41, 42 and 43 with the associated sections of skid members 35 and 36. In fact, it should be apparent that the arms of supporting assemblies 41, 42 and 43 must be slidably connected to skid members 35 or 36 or alternatively these arms should be in the form of telescopic members. However it is preferred to use a sliding arrangement as is shown in detail in FIGS. 4 and 5.

Referring therefore to FIGS. 4 and 5, a slide shoe 200 is fixed to an appropriate portion of the skid members 35 or 36 and a runner 210 is articulated to the associated arm of the supporting arm assembly 41, 42 or 43. Specifically, slide shoe 200 is in the form of an elongated constant cross-section element while runner 210 is formed of an elongated C-shaped section having an upper portion 211 with side wings 212 terminated at their lower portions with inwardly directed flanges 213. The inside dimension of the C-shaped channel member 210 is adapted to closely fit around slide shoe 200 thereby permitting longitudinal displacement of runner 210 with respect to slide shoe 200. On the upper part of runner 210 is provided a U-shaped connector 220 which is adapted to pivotally receive the lower end of the associated arm 901 etc. which in turn is provided with a transverse sleeve 225 which receives a tubular bushing 230. The assembly may be bolted together as shown at 240.

With this arrangement, the lower end of each arm is free to reciprocate longitudinally with respect to the associated skid member over the entire length of the slider shoe 200 which of course can be made as long as desired. Furthermore the sliding action of runners 210 and consequently the free displacement of each skid member 35, 36 in a vertical plane are facilitated by mounting the supporting arm assembles 40 to 43 in a trailing configuration with respect to their cross shafts 50 to 53.

The structure of skid members 35 and 36 can advantageously consist of a box-shaped channel 300 to the underside of which an elongated blade 310 is affixed such as by rivets as shown at 320. Preferably the blade member 310 may be of generally rectangular cross section with a recess on the upper portion for receiving the underside of box-shaped channel 300. In a preferred embodiment, blade 310 is made of hard, slippery, wear resistant plastic materials, for example ultra high molecular weight polyethyleny, polyurethene, nylon and materials known under the trademark "Teflon." To reduce wear and friction the track 12 can be provided with rows of metallic pressure members disposed on the inside surface thereof such as for example metallic cleats 160 as are already provided between the successive sprocket teeth holes 150 of most conventional snowmobile tracks. The material of slider shoe 200 can also be a hard, slippery, wear resistent plastic material and, as illustrated in FIGS. 4 and 5, the box-shaped channel 300 can be sandwiched between the plastic members 310 by means of sunk rivets 320 extending through the entire assembly.

It will be appreciated that the invention is not limited to pairs of articulated skid members 35 and 36 as more than two longitudinally aligned skid members could be installed with one or more individual supporting arm assemblies, along the length of each skid member and/or at the points of connection therebetween.

What we claim is:

1. A snowmobile suspension for mounting on the frame of a snowmobile and adapted to apply a substantial part of a snowmobile's weight upon the ground engaging portion of the track thereof, comprising at least two spaced parallel skids extending along a substantial portion of the length of the ground engaging portion of said track, at least two supporting arm assemblies extending between the bottom of the frame of said snowmobile and different spaced apart regions of said skids, pivotal means for pivotally connecting said supporting arm assemblies to the bottom of said frame and to each of said skids, one of said supporting arm assemblies being fixed against longitudinal movement relative to said skids while the other has elements movable with respect to said skids, spring means acting upon said supporting arm assemblies to resiliently maintain said frame a predetermined distance above said skids, each said skid consisting of at least two skid members articulated to one another in an end-to-end relationship and free to move relative to said frame in a vertical plane parallel to the length of said track under the action of said spring means and the weight of said snowmobile.

2. A suspension as defined in claim 1, wherein each said supporting arm assembly comprises at least one arm extending downwardly and rearwardly with respect to said frame, the lower end of said arm being coupled with one of said skid members.

3. A suspension as defined in claim 2, wherein the coupling of the arm of the leading supporting arm assembly consists of a pivotal connection with the associated skids, the arms of the other supporting arm assemblies being coupled to the adjacent skid members by means of a pivotal sliding arrangement allowing reciprocation of the lower end of the associated arm along the longitudinal axis of said adjacent skid member.

4. A suspension as defined in claim 1, further comprising a leading wheel mounted for rotation upon the inside surface of said track immediately in front of each said skid.

* * * * *